Oct. 16, 1934.   P. DAHL   1,977,544
SEAT SUPPORT
Filed April 20, 1934   2 Sheets-Sheet 1
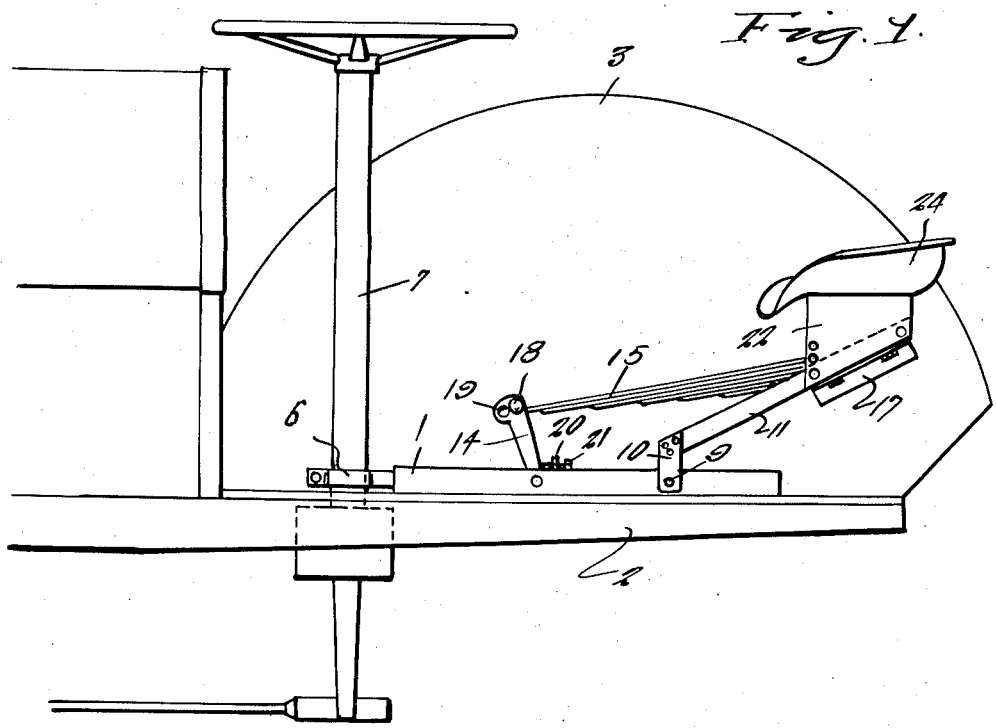
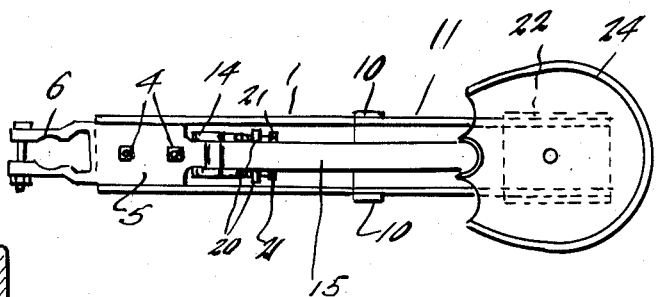
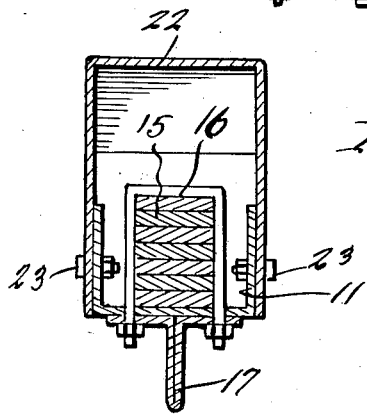
Inventor
PHILLIP DAHL.
By Clarence A O'Brien
Attorney Oct. 16, 1934.　　　　P. DAHL　　　　1,977,544
SEAT SUPPORT
Filed April 20, 1934　　　2 Sheets-Sheet 2
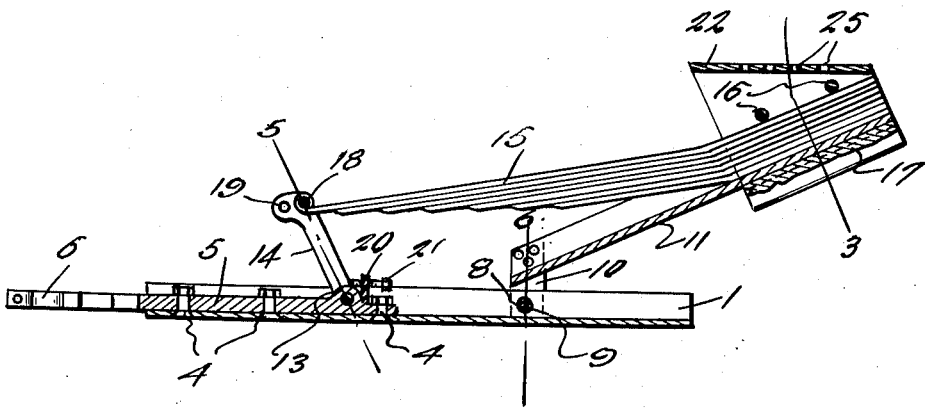
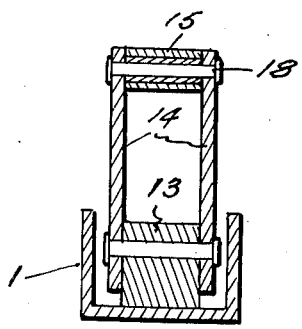
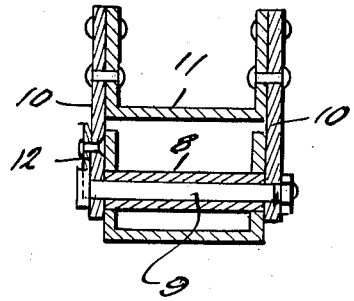
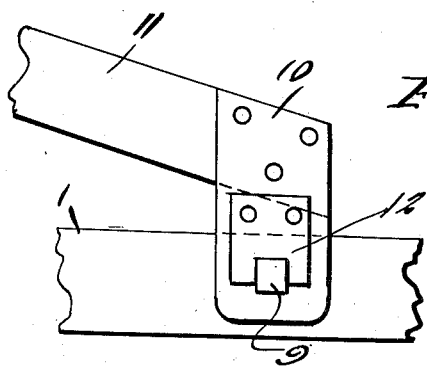
Inventor
PHILLIP DAHL.

Patented Oct. 16, 1934

1,977,544

UNITED STATES PATENT OFFICE 1,977,544

SEAT SUPPORT

Phillip Dahl, Volga, S. Dak.

Application April 20, 1934, Serial No. 721,633

5 Claims. (Cl. 155—51)

The present invention relates to new and useful improvements in seat supports particularly for agricultural machinery such as tractors, etc., and has for its primary object to provide, in a manner as hereinafter set forth, a support of this character which is resilient or yieldable for easy riding qualities but which embodies a novel construction, combination and arrangement of parts whereby, should breakage of any of the elements occur, the operator will not be dropped into the path of any machine that the tractor may be pulling or into the mechanism of any other machine upon which the support is used.

Other objects of the invention are to provide a seat support of the aforementioned character which will be comparatively simple in construction, strong, durable, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of the invention, showing the same installed on a tractor.

Figure 2 is a top plan view of the invention.

Figure 3 is a sectional view, taken substantially on the line 3—3 of Figure 4.

Figure 4 is a view in vertical longitudinal section through the invention.

Figure 5 is a sectional view, taken substantially on the line 5—5 of Figure 4.

Figure 6 is a view in vertical transverse section, taken substantially on the line 6—6 of Figure 4.

Figure 7 is a detail view in side elevation showing the means for mounting the swinging arm on the base bar.

Referring now to the drawings in detail, it will be seen that the embodiment of the invention which has been illustrated comprises a substantially channel-shaped bar 1 which is mounted longitudinally on the bed or frame 2 of a tractor 3 or other agricultural machine. Rigidly secured, as by bolts 4, in the forward portion of the base bar 1 is a plate 5 having on its forward end a forwardly projecting clamp 6 which is engaged with the steering column 7 of the tractor 3 for bracing and supporting said steering column.

Mounted transversely in the substantially channel-shaped base bar 1, rearwardly of the plate 5, is a bearing 8 (see Figure 6) in which a headed pivot bolt 9 is journaled. Metallic straps 10 are mounted on the end portions of the pivot bolt 9 and rigidly secured between said straps 10 is a substantially channel-shaped arm 11 which extends upwardly and rearwardly. A suitable lock 12 is fixed on one of the straps 10 and engaged with the head of the pivot bolt 9 for locking said pivot bolt to the straps 10 for movement in unison therewith.

The rear end portion of the plate 5 is formed to provide a bearing 13 in which a shackle 14 is journaled for swinging movement. The reference numeral 15 designates a substantially quarter elliptic leaf spring which is rigidly secured in the free end portion of the substantially channel-shaped arm 11 by U-bolts 16. The U-bolts 16 are engaged in a substantially T-shaped reinforcing member 17 (see Figure 3) which is provided beneath the arm 11 for strengthening said arm where the holes which accommodate said U-bolts 16 occur. The forward end of the spring 15 is connected to the bolt 18 of the shackle 14, the free end portions of the shackle arms having a plurality of openings therein, as at 19, in which the bolt 18 is selectively engageable for adjustment. A flange 20 rises from the rear end portion of the plate 5 and mounted therein are adjustable stop screws 21 which limit swinging movement of the shackle 14 in one direction.

The reference numeral 22 designates a bracket of substantially inverted U-shaped cross section which is rigidly secured on the free end portion of the arm 11 by bolts or the like 23 in a manner to enclose the adjacent end portion of the spring 15 and its U-bolts 16. The top of the bracket 22 is in a horizontal plane and secured thereon is a conventional seat 24. The bracket 22 has formed therein a plurality of holes 25 which permit adjustment of the seat 24 on said bracket.

In use, the leaf spring 15 yieldingly supports the swingable arm 11 under the weight of the operator, as is believed to be apparent. Of course, the spring 15 may comprise any desired number of leaves. By adjusting the stop screws 21 the seat may be conveniently raised or lowered as desired to meet various conditions. Should the arm 11, or any of the elements which connect said arm to the base bar 1 break, the spring 15, dropping upon the member 1 or the brackets 10, will retain the seat sufficiently to prevent the operator from being precipitated to the ground in back of the tractor and in the path of the on-coming machinery that the tractor may be pulling. Further, should the spring 15 or any of its connecting elements break, the arm 11, will drop upon the rear portion of the member 1 and thus said arm will retain the seat sufficiently to support the operator out of danger.

It is believed that the many advantages of a seat support constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A seat support of the class described comprising a base bar, an arm mounted for swinging movement on the base bar, a shackle mounted for swinging movement on the base bar forwardly of the arm, means for limiting swinging movement of the shackle toward the arm, a leaf spring secured on the arm and having one end connected with the shackle, and means on the arm for securing the seat thereto.

2. A seat support of the class described comprising a substantially channel-shaped base bar, a pivot bolt journaled transversely in the base bar, upstanding straps mounted on the end portions of the pivot bolt, a substantially channel-shaped inclined arm fixed between the straps, means connecting the pivot bolt to the straps for movement in unison therewith, a shackle mounted for swinging movement on the base bar forwardly of the pivot bolt, means for limiting rearward swinging movement of the shackle, a leaf spring secured in the arm and having one end operatively connected to the shackle, and means for mounting the seat on the arm.

3. A seat support of the class described comprising a substantially channel-shaped base bar, a pivot bolt journaled transversely in the base bar, upstanding straps mounted on the end portions of the pivot bolt, a substantially channel-shaped inclined arm affixed between the straps, means connecting the pivot bolt to the straps for movement in unison therewith, a shackle mounted for swinging movement on the base bar forwardly of the pivot bolt, means for limiting rearward swinging movement of the shackle, a leaf spring secured in the arm and having one end operatively connected to the shackle, and means for mounting the seat on the arm, said means including a substantially inverted U-shaped bracket rigidly secured on the free end portion of the arm, the top of said bracket extending in a substantially horizontal plane and having openings therein for connecting the seat thereto.

4. A seat support of the class described comprising a substantially channel-shaped base bar, an inclined arm pivotally mounted on the base bar, a shackle pivotally mounted on the base bar forwardly of the arm, a leaf spring rigidly secured to the arm and having one end operatively connected to the shackle, stop screws adjustably mounted in the base bar and engageable with the shackle for limiting movement of said shackle in one direction, and means for attaching the seat to the free end portion of the arm.

5. A seat support for agricultural machinery of the type having a steering column, comprising a substantially channel-shaped base bar, a plate rigidly secured in the base bar, a clamp on one end of the plate engaged with the steering column, a bearing on the other end portion of the plate, a shackle journaled for swinging movement in the bearing, an inclined arm mounted for swinging movement on the base bar rearwardly of the plate, a leaf spring secured to the free end portion of the arm and having one end operatively connected to the shackle, adjustable means mounted on the base bar for limiting swinging movement of the shackle in one direction, and means on the free end portion of the arm for attaching the seat thereto.

PHILLIP DAHL.